United States Patent [19]

Kosonen

[11] 4,382,848
[45] May 10, 1983

[54] CAM-ACTUATED STOP MEMBER FOR LIFTING MECHANISM

[75] Inventor: Vaino J. Kosonen, W. Redding, Conn.

[73] Assignee: Dorr-Oliver Incorporated, Stamford, Conn.

[21] Appl. No.: 282,633

[22] Filed: Jul. 13, 1981

[51] Int. Cl.³ .................... C25D 17/06; C25D 17/10; C25D 13/00
[52] U.S. Cl. .................................. 204/194; 204/225; 204/300 R; 204/288
[58] Field of Search .................. 204/225, 300 R, 208, 204/216, 286–288, 194, 279

[56] References Cited

U.S. PATENT DOCUMENTS

| | | |
|---|---|---|
| 3,124,521 | 3/1964 | Svladoshch et al. ............... 204/194 |
| 3,332,128 | 7/1967 | Mori ................................. 204/216 X |
| 3,625,806 | 12/1971 | Wennberg ........................ 204/208 X |
| 4,107,026 | 8/1978 | Freeman ........................ 204/300 R |
| 4,131,531 | 12/1978 | Kaneko et al. ..................... 204/208 |
| 4,304,650 | 12/1981 | Matsuo et al. ....................... 204/194 |

Primary Examiner—Donald R. Valentine
Attorney, Agent, or Firm—B. J. Kearns; H. M. Snyder

[57] ABSTRACT

A cam-actuated stop member in an electrode stripping mechanism prevents any lifting of the electrode away from the hooked lifting elements during lowering of the electrode against the doctor blades and so avoids damaging the electrode and/or lifting elements by dropping the electrode after doctoring.

2 Claims, 4 Drawing Figures

CAM-ACTUATED STOP MEMBER FOR LIFTING MECHANISM

BACKGROUND OF THE INVENTION

In recent years there has been a growing interest in electrofiltration devices of the type wherein electrodes are lifted from a filtration bath to a position in which the material deposited on the electrodes is stripped therefrom. U.S. Pat. No. 4,107,026, issued Aug. 15, 1978, shows such an electrofiltration device in FIG. 16 of that patent and a commercial version of that electrofiltration apparatus has been in successful operation for some time. In the stripping operation, the electrodes are each, in turn, lifted to a position above the bath, doctor blades are rotated into contact with the electrode and the electrode is then lowered toward the bath with the deposit material on the electrode being stripped therefrom as the electrode modes downwardly. However, the pressure of the doctor blades against the electrode and the deposited material offers substantial resistance to the downward course of the electrode with the result that the electrode ears are lifted away from the hook member with which they are usually in contact. When the doctor blades are rotated away from the electrode upon completion of the stripping operation, the electrode drops perhaps ¾ of an inch, slamming the electrode ears against the hook member, stretching the elevator chains and shaking the whole filter frame and its various parts and attachments. Since the electrode may weigh 2000 pounds or more, a very substantial hammering action is thus imposed on the apparatus, and malfunctions and a shortened life are the expected result.

SUMMARY OF THE INVENTION

This invention is directed to an improved electrode stripping mechanism wherein uncontrolled, abrupt, dropping of the electrode following the stripping operation is eliminated.

In accordance with this invention, lifting of the electrode ears from the lifting hook during downward stripping movement due to the forces applied by the doctor blades is prevented by provision of a cam-actuated stop member which contacts the electrode ears to block upward movement thereof.

More particularly, the cam-actuated stop member is fixed with respect to the hook member for vertical movement therewith, but is horizontally movable into close proximity to or engagement with the upper surface of the electrode lifting ear during upward movement of the electrode and said close proximity or engagement is maintained during downward stripping movement of the electrode so that lifting of the electrode ear away from the hook member is blocked.

These and other features and advantages of the invention will become more clear from the following descriptions of the preferred embodiment and the drawings.

DETAILED DESCRIPTION

Figure 1:
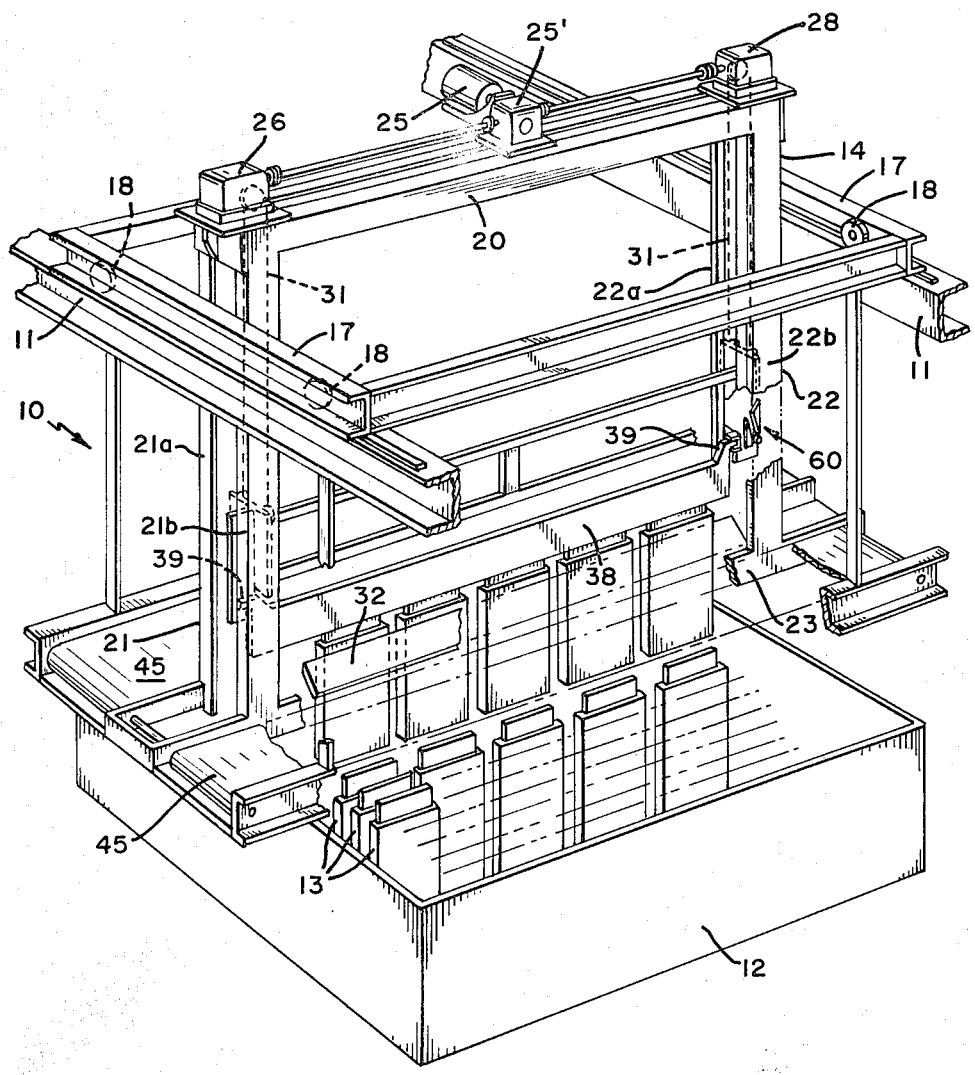
FIG. 1 is an isometric view of an electrofiltration apparatus with parts broken away.
Figure 2:
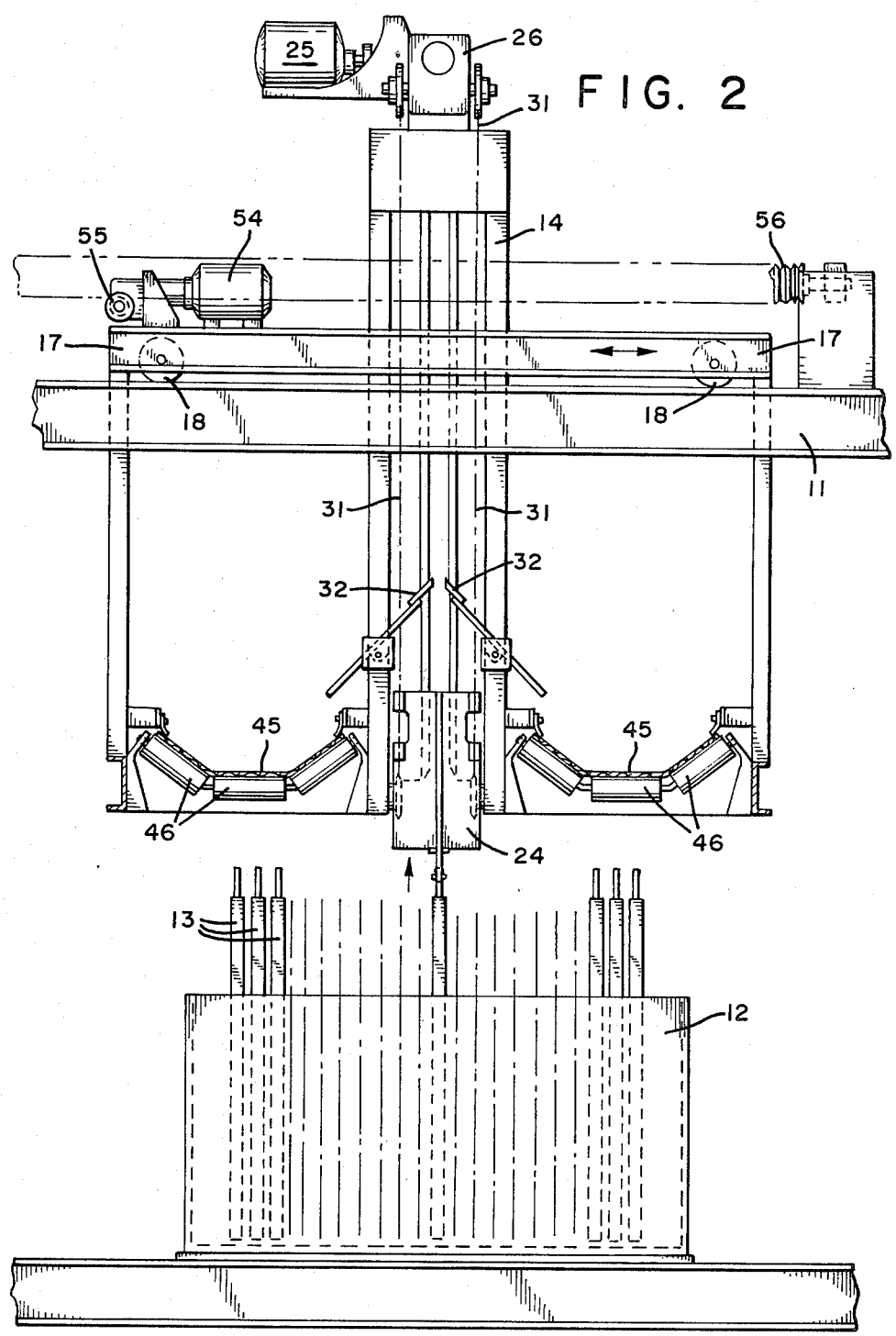
FIG. 2 is a view in elevation of the electrofiltration apparatus of FIG. 1.

Referring now to the drawings, in FIGS. 1 and 2 an electrode hoisting mechanism 10 is shown in operative position above an electrofiltration tank 12 containing a number of electrodes 13. The hoisting mechanism 10 comprises a hoist frame 14 rigidly connected to a carriage frame or movable bridge 17 which is supported by rollers 18 upon support rails 11. The hoist frame 14 includes vertical guide legs 21 and 22 for the electrode structures and a lower horizontal member 23. The vertical guide legs 21 and 22 each comprise a pair of vertical members 21a, 21b and 22a, 22b fixed to an upper horizontal member. Each pair of the vertical members (e.g., 21a, 21b) has positioned therebetween a hoisting rig 24. A hoisting motor 25 and speed reducers 25', 26 and 28 are mounted on the upper horizontal member 20 of the hoist frame 14. Speed reducers 26 and 28 are connected to elevator chains 31 which are run down between the vertical members 21a, 21b or 22a, 22b of the respective vertical guide legs 21 and 22 for connection with the hoisting rigs 24.

Fixed to the hoist frame 14 at opposite sides thereof and bridging the tank 12, are a pair of endless belt discharge conveyors 45 which include a plurality of rollers 46 for supporting the belt. Above the discharge conveyors 45 are positioned a pair of doctor blades 32 which are rotatably fixed to the hoist frame 14.

Mounted on movable bridge 17 is drive motor 54 having a drive gear 55 which meshes with a fixed drive screw 56 mounted on support rail 11 and extending along the entire travel path of the movable bridge 17.

The electrodes 13 are arranged in rows of, say, five electrodes, in the tank 12 with each row of electrodes joined to an electrode beam 38 so that each such row can be raised or lowered as a unit. The electrode beams 38 are configured so that the ends thereof terminate in projections or electrode beam ears 39 which can be caught or hooked for lifting by the jaw 48 (FIG. 3) of the hoisting rig 24.

Figure 3:
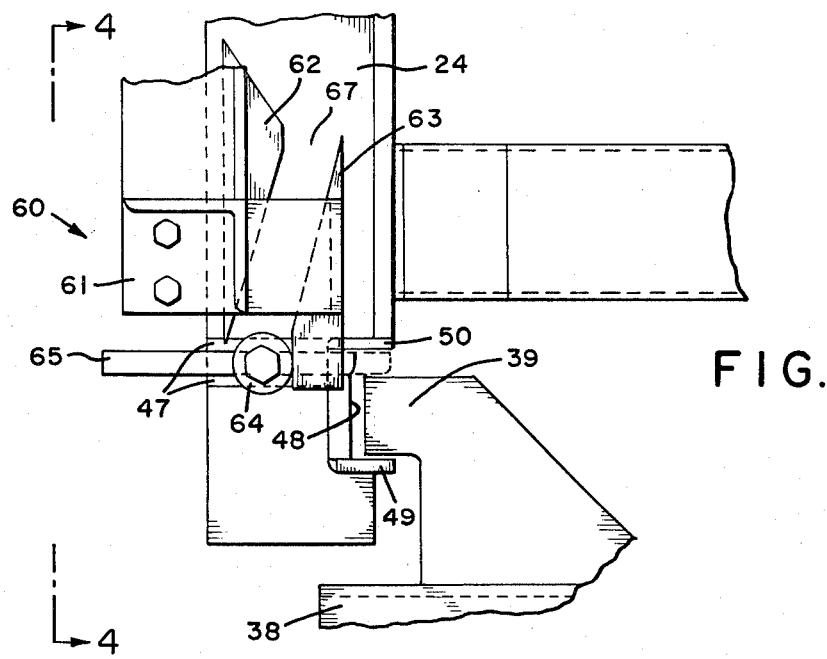
FIG. 3 is an enlarged view in elevation of the cam-actuated stop mechanism of the invention.
Figure 4:
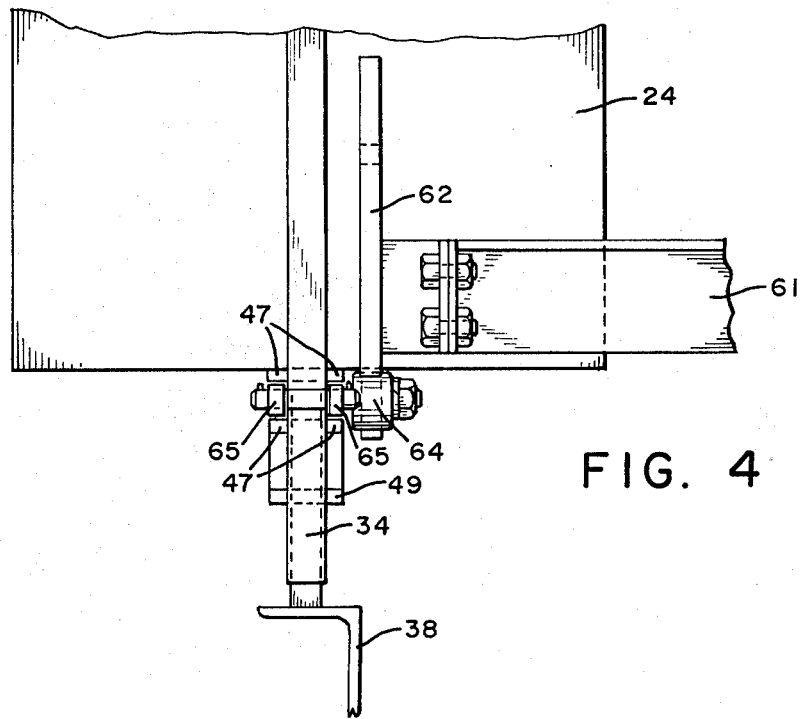
FIG. 4 is a view taken along line 4—4 of FIG. 3.

The cam-actuated stop device of the invention is illustrated in detail in FIGS. 3 and 4. The hoisting rig 24 has a depending member 34 provided with a hoisting rig jaw 48 which has a lower plate member 49 and an upper plate member 50. Supported about depending member 34 on guide rails 47 for slidable horizontal movement is the generally U-shaped stop member 65. One one leg of stop member 65 is mounted a cylindrical cam follower 64. A pair of cam members 62 and 63, fixed against vertical movement on cam support 61, define between them a cam groove 67.

In operation, the electrodes remain in the tank 12 receiving a deposit thereon except when a row of electrodes is lifted out of the tank for removal and recovery of the deposited material. The electrode hoisting mechanism 10 travels along support rail 11 and lifts each electrode beam, in turn, for doctoring of the electrode 13 in accordance with a predetermined program which may be automated. The hoisting rig 24 is moved by means of drive motor 54 and screw 56 to a selected electrode beam 38 so that the jaw 48 catches the electrode ear 39 and then motor 25 is actuated to lift the hoisting rig 24 and the electrode beam 38 by means of elevator chains 31. The jaw plates 47 and 49 of jaw 48 are spaced apart a sufficient distance to provide adequate clearance about electrode ear 39 to permit jaw 48 to move into hooking position without jamming. This necessary clearance amounts to about ¾" in a commercial apparatus.

When the electrodes 13 have reached the uppermost limit of their vertical travel, the doctor blades 32 are rotated (by means not shown) into contact with the electrodes 13 and the material deposited thereon to carry out the stripping operation. The hoisting rig 24 then starts its downward travel with the electrode ears 39 of electrode beam 38 at first resting on bottom plate 49 of jaw 48. However, the force exerted by doctor blades 32 against the electrodes 13 and the deposited material thereon tends to lift the anode ears 39 upwardly away from lower plates 49 and toward upper plate 50. It will be appreciated that when the stripping operator is completed, and the doctor blades 32 are rotated away from electrodes 13, the forces lifting the electrode beam ears 39 away from lower plate 49 suddenly cease. With the release of the lifting force, the electrode beam drops heavily against the lower plate 49. Since the array of electrodes with their electrode beam 38 weigh, in the commercial apparatus, approximately 2000 pounds, it will be appreciated that the regular hammering of the hoisting rig 29 by the electrode ears 39 can have a devastating effect on the hoisting rig, the elevator chains 31 and associated mechanical apparatus as well as resulting in deformation of the electrode beam ears 39.

In order to prevent this undesirable hammering action, cam assembly 60 (FIGS. 3 and 4) is provided comprising a pair of cam members 62 and 63 together forming a cam groove 67 and a stop member 65 having cam follower 64 thereon is slidably supported between slide rails 47. The cam members 62 and 63 are fixed to hoist frame 14 by cam support 61 whereas stop member 65 is fixed relative to hoisting rig 24 by slide rails 47 and so moves vertically with the hoisting rig 24. However, as the hoisting rig 24 moves upwardly, the cam follower 64 is drawn along cam groove 67 thereby imparting horizontal movement to stop member 65. The stop member 65 slides between guide rails 47 and intrudes into the region of jaw 48, assuming a position occupying the space between the upper surface of electrode ear 39 and the upper plate member 50 (see dotted line showing in FIG. 3). The stop member 65 occupies its new position during the upward travel of the electrode beam 38 as well as during the downward movement of the electrode beam 38, as the deposited material is stripped from the electrodes by the doctor blades. It will be appreciated that with the stop member 65 in position during the stripping operation, any tendency for the electrode ear 39 to lift off the lower plate member 49 of jaw 48 is blocked by immediate contact with stop member 65. Accordingly, the undesirable hammering action does not occur.

After the deposited material has been stripped from the electrodes 13, the electrode beam 38 continues its downward travel to return the electrodes to the bath. This downward travel takes the cam follower 65 into the upper entrance of cam groove 67 and, as downward travel continues, the stop member 65 is retracted from its advanced position in jaw 48 thereby freeing the hoisting rig 24 from electrode beam ear 39 and permitting movement of carriage frame 17 to transport the hoisting rig 24 to the next electrode beam in the sequence.

There has thus been presented a novel, but relatively simple, solution to a serious mechanical problem in the operation of electrofiltration equipment.

It is expressly understood that the present invention is not limited to the embodiment illustrated and described. Various changes can be made in the design and arrangement of parts without departing from the spirit and scope of the invention as the same will now be understood by those skilled in the art.

What is claimed is:

1. In an electrode stripping mechanism for raising and lowering electrodes from a bath so that deposits on the electrodes may be stripped, wherein a vertically movable hook member engages an electrode lifting ear to raise the electrode out of said bath and wherein a stripping device contacts said electrode as said electrode is being lowered for return to said bath, the contact of the stripping device with said electrode tending to lift said lifting ear away from said hook member, the improvement comprising a cam-actuated stop member mounted for vertical movement with said hook member and horizontally movable into close proximity or engagement with the upper surface of said lifting ear during upward movement of said electrode thereby maintaining contact between the lower surface of said anode ear and said hook member during the stripping operation.

2. In an electrode stripping mechanism as set forth in claim 1, the improvement further comprising fixed elements having cam surfaces thereon and a cam follower on said stop member for engagement with said cam surfaces.

* * * * *